US009658916B2

(12) United States Patent
Yoshinaga et al.

(10) Patent No.: US 9,658,916 B2
(45) Date of Patent: May 23, 2017

(54) SYSTEM ANALYSIS DEVICE, SYSTEM ANALYSIS METHOD AND SYSTEM ANALYSIS PROGRAM

(71) Applicant: NEC Corporation, Minato-ku, Tokyo (JP)

(72) Inventors: Naoki Yoshinaga, Tokyo (JP); Masanao Natsumeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/895,715

(22) PCT Filed: May 29, 2014

(86) PCT No.: PCT/JP2014/002842
§ 371 (c)(1),
(2) Date: Dec. 3, 2015

(87) PCT Pub. No.: WO2014/208002
PCT Pub. Date: Dec. 31, 2014

(65) Prior Publication Data
US 2016/0132373 A1    May 12, 2016

(30) Foreign Application Priority Data

Jun. 25, 2013 (JP) .................................. 2013-132226
Aug. 27, 2013 (JP) .................................. 2013-175176

(51) Int. Cl.
*G06F 11/00* (2006.01)
*G06F 11/07* (2006.01)
(Continued)

(52) U.S. Cl.
CPC ........ *G06F 11/079* (2013.01); *G06F 11/0751* (2013.01); *G06F 11/34* (2013.01);
(Continued)

(58) Field of Classification Search
USPC ................................................ 714/47.1, 47.2
See application file for complete search history.

(56) References Cited

U.S. PATENT DOCUMENTS

2010/0306597 A1    12/2010  Goldszmidt et al.
2011/0276828 A1*   11/2011  Tamaki .............. G05B 23/0254
                                                              714/26
(Continued)

FOREIGN PATENT DOCUMENTS

JP    2011-192097 A    9/2011
JP    2012-009064 A    1/2012
(Continued)

OTHER PUBLICATIONS

International Search Report for PCT Application No. PCT/JP2014/002842, mailed on Aug. 19, 2014.
(Continued)

*Primary Examiner* — Sarai Butler

(57) ABSTRACT

A system analysis device 100 includes a whole model generation unit 1021 which generates a whole model which is obtained by modeling elements or whole of a system and which includes a plurality of partial models, a core model generation unit 1023 which extracts, from a plurality of whole models generated on the basis of the same event, the partial models whose prediction precision satisfies a predetermined criteria, and generates a core model by integrating the extracted partial models, and a threshold setting unit 1024 which calculates a distance between the core model and the plurality of whole models using a predetermined definition, and outputs the distance as a threshold value for error determination using the core model.

11 Claims, 8 Drawing Sheets

(51) Int. Cl.
*G06F 11/34* (2006.01)
*G06N 7/00* (2006.01)
*G06N 99/00* (2010.01)

(52) U.S. Cl.
CPC ...... *G06F 11/3409* (2013.01); *G06F 11/3447* (2013.01); *G06N 7/005* (2013.01); *G06N 99/005* (2013.01)

(56) References Cited

U.S. PATENT DOCUMENTS

2015/0195192 A1* 7/2015 Vasseur ............... G06F 11/2007
 714/47.3
2015/0331770 A1* 11/2015 Heilper ................. G06F 11/263
 714/33

FOREIGN PATENT DOCUMENTS

| JP | 4872944 B2 | 2/2012 |
| WO | 2012/086824 A1 | 6/2012 |

OTHER PUBLICATIONS

English translation of Written opinion for PCT Application No. PCT/JP2014/002842.

* cited by examiner

Fig.2

| | | WHOLE MODEL | | | |
|---|---|---|---|---|---|
| | | /122a | /122b | /122c | /122d |
| | | 2000/ 12/24 | 2001/ 12/24 | 2002/ 12/24 | 2003/ 12/24 |
| MODEL PREDICTION PRECISION | Model 1 | 0 | 1 | 1 | 0 |
| | Model 2 | 1 | 1 | 1 | 1 |
| | Model 3 | 0 | 0 | 1 | 0 |
| | Model 4 | 1 | 1 | 1 | 1 |
| | Model 5 | 1 | 1 | 1 | 1 |
| | Model 6 | 1 | 1 | 0 | 1 |
| | Model 7 | 0 | 0 | 0 | 1 |
| | Model 8 | 1 | 1 | 1 | 1 |
| | Model 9 | 1 | 0 | 0 | 1 |
| | Model 10 | 1 | 1 | 1 | 0 |

⇩ CORE MODEL $$\begin{pmatrix} \text{Model 2} \\ \text{Model 4} \\ \text{Model 5} \\ \text{Model 8} \end{pmatrix} = \begin{pmatrix} 1 \\ 1 \\ 1 \\ 1 \end{pmatrix}$$ /123a

Fig.3

| | | CORE MODEL | | | | |
|---|---|---|---|---|---|---|
| | | w/o 2000/12/24 | w/o 2001/12/24 | w/o 2002/12/24 | w/o 2003/12/24 | All |
| MODEL PREDICTION PRECISION | Model 1 | 0 | 0 | 0 | 0 | 0 |
| | Model 2 | 1 | 1 | 1 | 1 | 1 |
| | Model 3 | 0 | 0 | 0 | 0 | 0 |
| | Model 4 | 1 | 1 | 1 | 1 | 1 |
| | Model 5 | 1 | 0 | 1 | 1 | 1 |
| | Model 6 | 0 | 1 | 0 | 0 | 0 |
| | Model 7 | 1 | 0 | 1 | 1 | 0 |
| | Model 8 | 0 | 0 | 0 | 0 | 1 |
| | Model 9 | 0 | 0 | 1 | 0 | 0 |
| | Model 10 | 0 | 0 | 1 | 1 | 0 |
| DISTANCE | | | | | | |

124 ⇒ MAXIMUM DISTANCE
1

| | | WHOLE MODEL | | | |
| --- | --- | --- | --- | --- | --- |
| | | 2000/12/24 | 2001/12/24 | 2002/12/24 | 2003/12/24 |
| MODEL PREDICTION PRECISION | Model 2 | 0.1 | 0.1 | 0.2 | 0.15 |
| | Model 3 | 0.99 | 1 | 1 | 1 |
| | Model 4 | 0.5 | 0.5 | 0.5 | 0.5 |

| | | CORE MODEL | | | |
| --- | --- | --- | --- | --- | --- |
| | | w/o 2000/12/24 | w/o 2001/12/24 | w/o 2002/12/24 | w/o 2003/12/24 |
| MODEL PREDICTION PRECISION | Model 2 | 0.15 | 0.15 | 0.12 | 0.13 |
| | Model 3 | 1 | 1.00 | 1.00 | 1.00 |
| | Model 4 | 0.5 | 0.5 | 0.5 | 0.5 |
| DISTANCE | | 0.00095 | 0.00097 | 0.0026 | 0.00016 |

124b  ⬇ MAXIMUM DISTANCE
0.0026

Fig.7

| MODEL PREDICTION PRECISION | WHOLE MODEL | | | | RANGE |
|---|---|---|---|---|---|
| | 2000/12/24 (122e) | 2001/12/24 (122f) | 2002/12/24 (122g) | 2003/12/24 (122h) | |
| Model 1 | 0.7 | 0.8 | 0.5 | 0.2 | 0.5 |
| Model 2 | 0.1 | 0.1 | 0.2 | 0.15 | 0.1 |
| Model 3 | 0.99 | 1 | 1 | 1 | 0.01 |
| Model 4 | 0.5 | 0.5 | 0.5 | 0.5 | 0 |

⇒ CORE MODEL 123b $$\begin{Bmatrix} \text{Model 2} \\ \text{Model 3} \\ \text{Model 4} \end{Bmatrix} = \begin{Bmatrix} 1 \\ 1 \\ 1 \end{Bmatrix}$$

SYSTEM ANALYSIS DEVICE, SYSTEM ANALYSIS METHOD AND SYSTEM ANALYSIS PROGRAM

This application is a National Stage Entry of PCT/JP2014/002842 filed on May 29, 2014, which claims priority from Japanese Patent Application 2013-132226 filed on Jun. 25, 2013, 2013-175176 filed on Aug. 27, 2013, the contents of all of which are incorporated herein by reference, in their entirety.

TECHNICAL FIELD

The present invention relates to a system analysis device, a system analysis method, and a program, for analyzing a failure, an error, and the like of a system.

BACKGROUND ART

PTL 1 describes an example of an operation management system which models a system using time series information on system performance and determines a cause of a failure or an error of the system using the generated model.

The operation management system described in PTL 1 generates a correlation model of a system by determining a correlation function representing correlation for each pair of a plurality of metrics on the basis of measurement values of the plurality of metrics of the system. The operation management system detects destruction of the correlation (correlation destruction) using the generated correlation model, and determines a failure cause of the system on the basis of the correlation destruction. The technique analyzing a state of a system on the basis of correlation destruction in this way is called an invariant relation analysis. In the invariant relation analysis, for example, regarding a pair of metrics y and u, a correlation function for predicting the metric y on the basis of the metric u is used. Then, from a difference between an actual measurement value of the metric y in time series information at the time of model generation and a predicted value according to the correlation function, i.e. a prediction error, a permissible prediction error at the time of monitoring is calculated, and is set as a threshold value. A case in which a prediction error exceeds a threshold value at the time of monitoring is correlation destruction, and indicates occurrence of an error.

PTL 2, on the other hand, describes an example of a learning type process error diagnosis apparatus which models a system using time series information of an adjustable parameter, and determines a cause of a failure or an error and the like of the system using the generated model.

The learning type process error diagnosis apparatus described in PTL 2 generates a model from setting values of the adjustable parameter set multiple times in the past, and automatically calculates a possible normal range of the adjustable parameter on the basis of probability theory. The learning type process error diagnosis apparatus determines that the adjustable parameter has an error when the adjustable parameter goes beyond the calculated normal range.

CITATION LIST

Patent Literature

PTL1: Japanese Patent Publication No. 4872944
PTL2: Japanese Laid-open Patent Publication No. 2012-9064

SUMMARY OF INVENTION

Technical Problem

There is an event which is desired to be monitored in a system although an occurrence frequency is low. For example, in an ICT (Information and Communication Technology) system, such event may be a presence or absence of a sign of a failure at the time of a heavy load, which may occur only several times per year, whether a shutdown of a constantly-operating system is executed appropriately, or the like.

However, when monitoring the event having low occurrence frequency, a time period between the time of model generation and time of monitoring is long. Therefore, there is a problem that a learned model is not established strictly due to modification of a system or change of system setting, and other aging variations.

In a method of using a prediction error for error determination as described in PTL 1, modification of a system or change of system setting may affect an entire model since an effect of change in a system is likely to appear in a model. In that case, it may be difficult to distinguish normality from an error of a system after modification or change of setting with a model generated from an event before modification or change of setting.

In a method of using the probability theory as described in PTL 2, when there are a few cases, a probability distribution which each measurement value follows may not be obtained, and a model which can be used for monitoring may not be constructed.

An object of the present invention is to provide a system analysis device, a system analysis method, and a program, which can perform error determination of a system by monitoring an event having low occurrence frequency with high accuracy.

Solution to Problem

A system analysis device according to an exemplary aspect of the invention includes: a whole model generation unit which generates a whole model which is obtained by modeling one or more elements or whole of a system and which includes a plurality of partial models; a core model generation unit which extracts, from a plurality of whole models generated on the basis of the same event, the partial models whose prediction precision satisfies a predetermined criteria, and generates a core model by integrating the extracted partial models; and a threshold setting unit which calculates a distance between the core model and the plurality of whole models using a predetermined definition, and outputs the distance as a threshold value for error determination using the core model.

A system analysis method according to an exemplary aspect of the invention includes: generating a whole model which is obtained by modeling one or more elements or whole of a system and which includes a plurality of partial models; extracting, from a plurality of whole models generated on the basis of the same event, the partial models whose prediction precision satisfies a predetermined criteria, and generating a core model by integrating the extracted partial models; and calculating a distance between the core model and the plurality of whole models using a predetermined definition, and outputting the distance as a threshold value for error determination using the core model.

A system analysis program according to an exemplary aspect of the invention causes a computer to execute processes including: a whole model generation process which generates a whole model which is obtained by modeling one or more elements or whole of a system and which includes a plurality of partial models; a core model generation process which extracts, from a plurality of whole models generated on the basis of the same event, the partial models whose prediction precision satisfies a predetermined criteria, and generates a core model by integrating the extracted partial models; and a threshold setting process which calculates a distance between the core model and the plurality of whole models using a predetermined definition, and outputs the distance as a threshold value for error determination using the core model.

Advantageous Effects of Invention

According to the present invention, it is possible to perform error determination of a system by monitoring an event having low occurrence frequency with high accuracy.

BRIEF DESCRIPTION OF DRAWINGS

FIG. 2 is an explanatory diagram illustrating a generation example of a core model.

FIG. 3 is an explanatory diagram illustrating a calculation example of a threshold value for error determination.

FIG. 7 is an explanatory diagram illustrating a method for extracting a core model on the basis of a threshold value related to a variation of the prediction precision.

DESCRIPTION OF EMBODIMENTS

The exemplary embodiment of the present invention will be described with reference to drawings. In the present exemplary embodiment, as an example, an application to error detection of an IT (Information Technology) system is described. In the present exemplary embodiment, it is assumed that an event to be monitored is one type. When there is a plurality of types of events to be monitored, the operations of the present exemplary embodiment are required to be performed in parallel for respective events.

Figure 1:
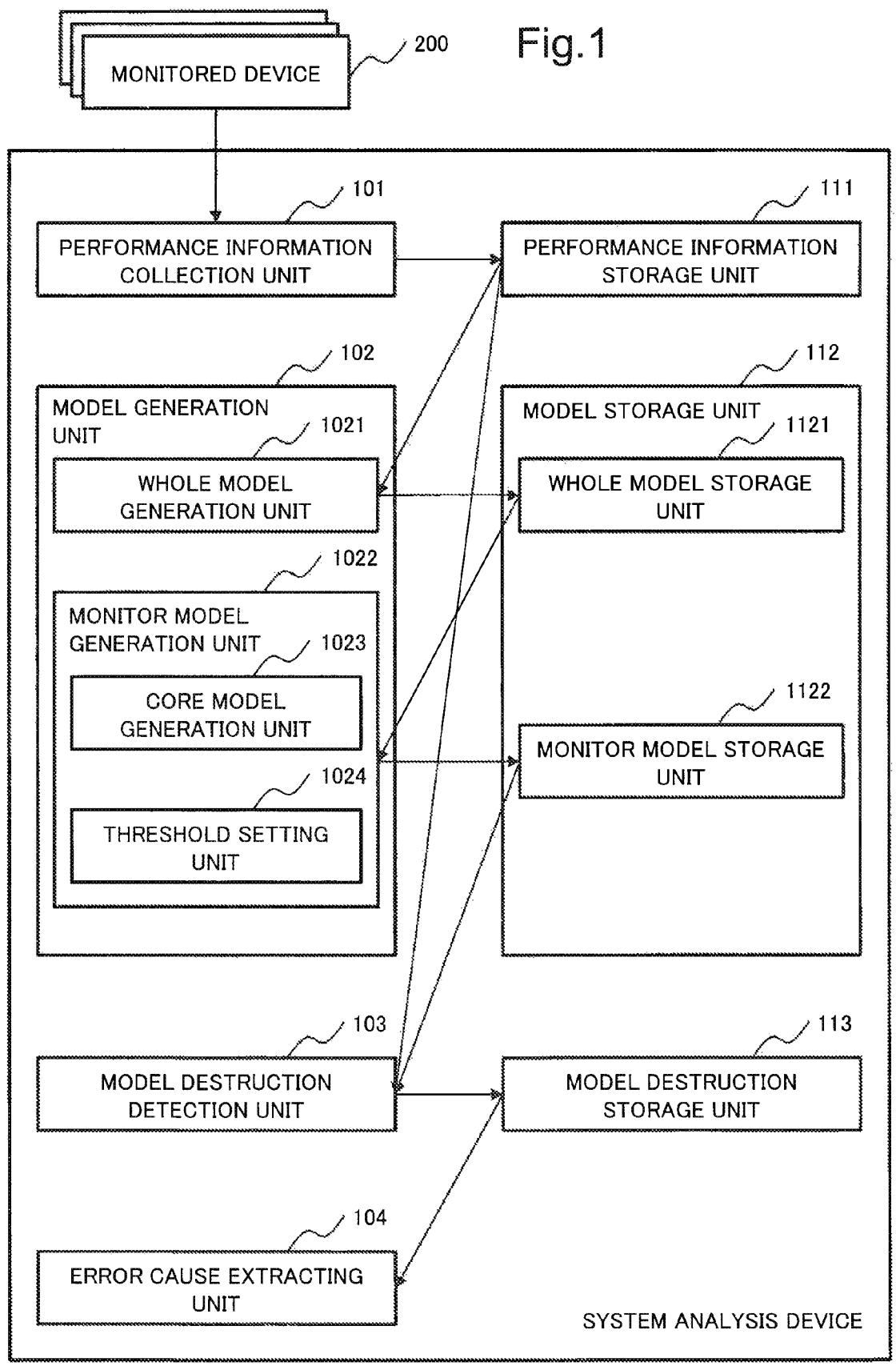
FIG. 1 is a block diagram illustrating a configuration of an exemplary embodiment of a system analysis device according to the present invention.

The configuration of the system analysis device according to the present exemplary embodiment will be described. FIG. 1 is a block diagram illustrating a configuration of a system analysis device 100 according to the exemplary embodiment.

As illustrated in FIG. 1, the system analysis device 100 of the present exemplary embodiment is connected with a monitored system which includes one or more monitored devices 200. The monitored devices 200 are devices which constitutes an IT system, such as various server devices and network devices. The monitored system may be limited to an element which constitutes a function, or may be an entire system.

The monitored device 200 measures an actual measurement data (measurement value) of a plurality of items of performance values on the monitored device 200 at regular intervals, and transmits the data to the system analysis device 100. As the items of performance values, usage rates, usage amount or the like of computer resources or network resources, such as usage rate of a CPU (Central Processing Unit), usage rate of a memory, and disk access frequency is utilized.

An item of the performance value for each monitored device 200 is set as a metric (performance index), and a group of values of a plurality of metrics measured at the same time is set as performance information. The metric is represented by a numerical value of an integer or a decimal. The metric corresponds to the "element" which is an object for generating a correlation model in the invention described in PTL1.

The system analysis device 100 generates a monitor model of the monitored device 200 for each event on the basis of the performance information collected from the monitored device 200, and analyzes a state of the monitored device 200 on the basis of model destruction detected by using the generated monitor model. In order to generate the monitor model, the system analysis device 100 generates one whole model for one event on the basis of the performance sequence information which is performance information for the period from the occurrence of the event to be monitored until the end thereof, the performance information being collected from the monitored device 200. Furthermore, the system analysis device 100 generates a core model using a whole model set which is a set of a plurality of whole models generated for the same event, and sets a threshold value 124 for error determination. The monitor model is obtained by setting the threshold value 124 for error determination to the core model.

The system analysis device 100 includes a performance information collection unit 101, a model generation unit 102, a model destruction detection unit 103, an error cause extracting unit 104, a performance information storage unit 111, a model storage unit 112, and a model destruction storage unit 113.

The model generation unit 102 includes a whole model generation unit 1021 and a monitor model generation unit 1022.

The monitor model generation unit 1022 includes a core model generation unit 1023 and a threshold setting unit 1024.

The model storage unit 112 includes a whole model storage unit 1121 and a monitor model storage unit 1122.

The performance information collection unit 101 collects the performance information from the monitored device 200.

The performance information storage unit 111 stores a time-series variation of the performance information collected by the performance information collection unit 101 as the performance sequence information.

The model generation unit 102 generates the monitor model of the monitored system on the basis of the performance sequence information.

The whole model generation unit 1021 generates a whole model which is obtained by modeling one or more elements or whole of the system and which includes a plurality of partial models. Specifically, the whole model generation unit 1021 generates a prediction equation related to each metric from the performance sequence information for each event, and calculates prediction precision of each prediction equation. Here, a pair of the prediction equation and the prediction precision is the partial model, and a set of the partial models for one event, i.e. a set of the prediction equations and the prediction precision which are generated for all the metrics, is the whole model. The whole model generation unit 1021 stores the whole model for the event in the whole model storage unit 1121. For the prediction equation, a periodic function in which a time is included, a correlation function among three or more metrics, a correlation function between two metrics as in the operation management device in PTL1, and the like are used.

The monitor model generation unit 1022 generates a core model from the whole model set stored in the whole model storage unit 1121, and calculates the threshold value 124 for error determination. The monitor model generation unit 1022 stores the generated core model and threshold value 124 for error determination in the monitor model storage unit 1122 as the monitor model.

Regarding the whole model set, the core model generation unit 1023 generates the core model so as to satisfy the generation conditions of the core model. Specifically, the core model generation unit 1023 extracts, from a plurality of whole models generated on the basis of the same event, one or more partial models whose prediction precision satisfies a predetermined criteria, and generates a core model by integrating the extracted partial models. The detailed contents related to a method for generating the core model will be described later.

The threshold setting unit 1024 calculates the threshold value from fluctuation of the whole model set used for generating the core model. The threshold setting unit 1024 calculates a distance between the core model and a plurality of whole models using a predetermined definition, and outputs the distance as the threshold value in the error determination using the core model. The detailed contents related to a method for calculating the threshold value will be described later.

The model storage unit 112 stores the whole model set and the monitor model generated by the model generation unit 102.

The whole model storage unit 1121 stores the whole model set generated by the whole model generation unit 1021.

The monitor model storage unit 1122 stores the monitor model generated by the monitor model generation unit 1022.

The model destruction detection unit 103 detects destruction of the monitor model with respect to newly input performance information.

The model destruction storage unit 113 stores the model destruction information which indicates the model from which model destruction is detected.

The error cause extracting unit 104 extracts a candidate of the metric on which an error occurs (error cause metric) on the basis of the model destruction information. The error cause extracting unit 104 extracts, for example, the candidate of the error cause metric on the basis of the number of model destruction or ratio thereof for each metric, as in the operation management device of PTL1.

Note that the system analysis device 100 may be a computer which includes a CPU and a storage medium on which a program is stored, and which operates under the control of the CPU based on the program. In addition, the performance information storage unit 111, the model storage unit 112, and the model destruction storage unit 113 may be individual storage media respectively or may be constituted by a single storage medium.

Next, a first example of the method for generating the core model and the method for calculating the threshold value for error determination in the present exemplary embodiment will be specifically described. First, the generation conditions of core model are specifically described using Example. In the following example, a condition that a model whose prediction precision in the whole model set is equal to or greater than a given threshold value is used as the generation conditions of core model.

FIG. 2 is an explanatory diagram illustrating a generation example of the core model. The core model generation unit 1023 acquires the whole model set including the generated whole models 122*a*, 122*b*, 122*c*, and 122*d* for the same event. Next, the core model generation unit 1023 replaces the partial models (Model 1 to Model 10 in FIG. 2) included in each whole model with a numeric vector which is expressed by 1 or 0 on the basis of the prediction precision of the partial model. The core model generation unit 1023 replaces the model with 1 when the prediction precision of the partial model is equal to or greater than the predetermined threshold value, and replaces the model with 0 when the prediction precision is smaller than the threshold value. Next, the core model generation unit 1023 integrates, in the state of a numeric vector, the partial models expressed by 1 in the numeric vectors for all the whole models in the whole model set to extract a core model 123*a*. The core model 123*a* extracted in this example is constituted by the numerically-vectorized partial models of Model 2, Model 4, Model 5, and Model 8.

Next, an example of the method for calculating the threshold value 124 for error determination will be specifically described. In the following example, Hamming distance is used for a distance between the models. The threshold setting unit 1024 generates a core model for a whole model subset which is obtained by excluding one whole model from the whole model set in the same or similar manner as the above-described core model generation unit 1023 (hereinafter, described as a whole model subset core model). The threshold setting unit 1024 calculates a distance between the core model and the whole model subset core model. The threshold setting unit 1024 sets the maximum distance as the threshold value when the distances are calculated for all the patterns by changing the whole model to be excluded from the whole model set.

FIG. 3 is an explanatory diagram illustrating a calculation example of the threshold value 124 for error determination. The data illustrated in FIG. 2 is used for the data for calculation. The expression "w/o 2000/12/24" in the drawing indicates a core model generated using the whole models other than the expression "2000/12/24", and the expression "All" in the drawing indicates the core model 123*a*. As illustrated in FIG. 3, the maximum distance between the core model 123*a* and the whole model not used for generating the core model 123*a* is 1. Therefore, the threshold setting unit 1024 sets the distance 1 as the threshold value 124 for error determination.

Therefore, when an event to be monitored newly occurs, the system analysis device 100 of the present example judges that it is an error when Hamming distance between the new whole model generated from the event and the core model 123*a* is equal to or greater than two, and that it is normal when the distance is equal to or smaller than one. If the core model 123a is taken as an example, it is judged as error in a case that the prediction precision in two or more models among Model 2, Model 4, Model 5, and Model 8 is smaller than the threshold value of the prediction precision provided for each model.

Next, a second example of the method for generating the core model and the method for calculating the threshold value 124 for error determination will be described using 1-cosine similarity as the distance between the models. In the second example, the core model generation unit 1023 generates a core model by integrating partial models which are commonly included in a plurality of whole models generated on the basis of the same event, and whose variance of prediction precision is equal to or smaller than a predetermined value for all the whole models. In this case, the threshold setting unit 1024 generates, like the core model generation unit 1023 of the present example, a core model (whole model subset core model) under the condition that a variance of the prediction precision for the whole model subset obtained by excluding one whole model from the whole model set is equal to or smaller than a given threshold value. The threshold setting unit 1024 calculates a distance between the core model and the whole model subset core model by using 1-cosine similarity. The threshold setting unit 1024 sets the maximum distance as the threshold value when the distances are calculated for all the patterns by changing the whole model to be excluded from the whole model set.

Figures 4, 5:
FIG. 4 is an explanatory diagram illustrating an example of a prediction precision of a generated core model.
FIG. 5 is an explanatory diagram illustrating a calculation example of the threshold value for error determination using the example of FIG. 4.

FIG. 4 is an explanatory diagram illustrating an example of a prediction precision of a generated core model. FIG. 5 is an explanatory diagram illustrating a calculation example of the threshold value 124b for error determination using the example of FIG. 4. The expression "w/o 2000/12/24" illustrated in FIG. 5 indicates a core model generated using the whole models other than the expression "2000/12/24" illustrated in FIG. 4. The method for calculating the distance between the whole model subset and the whole model in the present example will be described using the data illustrated in FIG. 4 and FIG. 5. First, the threshold setting unit 1024 calculates an average value of prediction precision with respect to the whole model subset core model, and calculates cosine similarity between the average value and the prediction precision of the model included in the core model among the whole model. Then, the threshold setting unit 1024 sets 1-cosine similarity as the distance between the whole model subset core model and the whole model. As illustrated in FIG. 5, the maximum distance between the core model and the whole model which is not used for generating the core model is 0.0026. Therefore, the threshold setting unit 1024 sets the distance 0.0026 as the threshold value 124b for error determination.

When an event to be monitored newly occurs, the model destruction detection unit 103 uses the same method as the method for calculating the threshold value, as the method for calculating the distance between a new whole model generated from the event and the core model. Therefore, when an event to be monitored newly occurs, the system analysis device 100 of the present example judges that it is an error if 1-cosine similarity between the new whole model generated from the event and the core model is greater than 0.0026 and it is normal if 1-cosine similarity is equal to or smaller than 0.0026.

When Hamming distance is used as the distance between the models as in the first example, the core model generation unit 1023 generates the core model using the condition that it is a model whose prediction precision for the whole model set is equal to or greater than a given threshold value. When 1-cosine similarity is used as the distance between the models as in the second example, the core model generation unit 1023 generates the core model using the condition that it is a model whose variance of the prediction precision for the whole model set is equal to or smaller than a given threshold value. However, the methods for calculating the distance between the models and the conditions for generating the core model may arbitrarily be combined. The core model generation unit 1023 may generate the core model under the condition which is obtained by combining a plurality of conditions such as "it is a model whose prediction precision for the whole model set is equal to or greater than a given threshold value, and/or it is a model whose variance of the prediction precision for the whole model set is equal to or smaller than a given threshold value". The core model generation unit 1023 may generate the core model so that the distance between the whole model subset core model and each whole model included in the whole model subset is reduced with respect to the distance between certain models.

Figure 6:
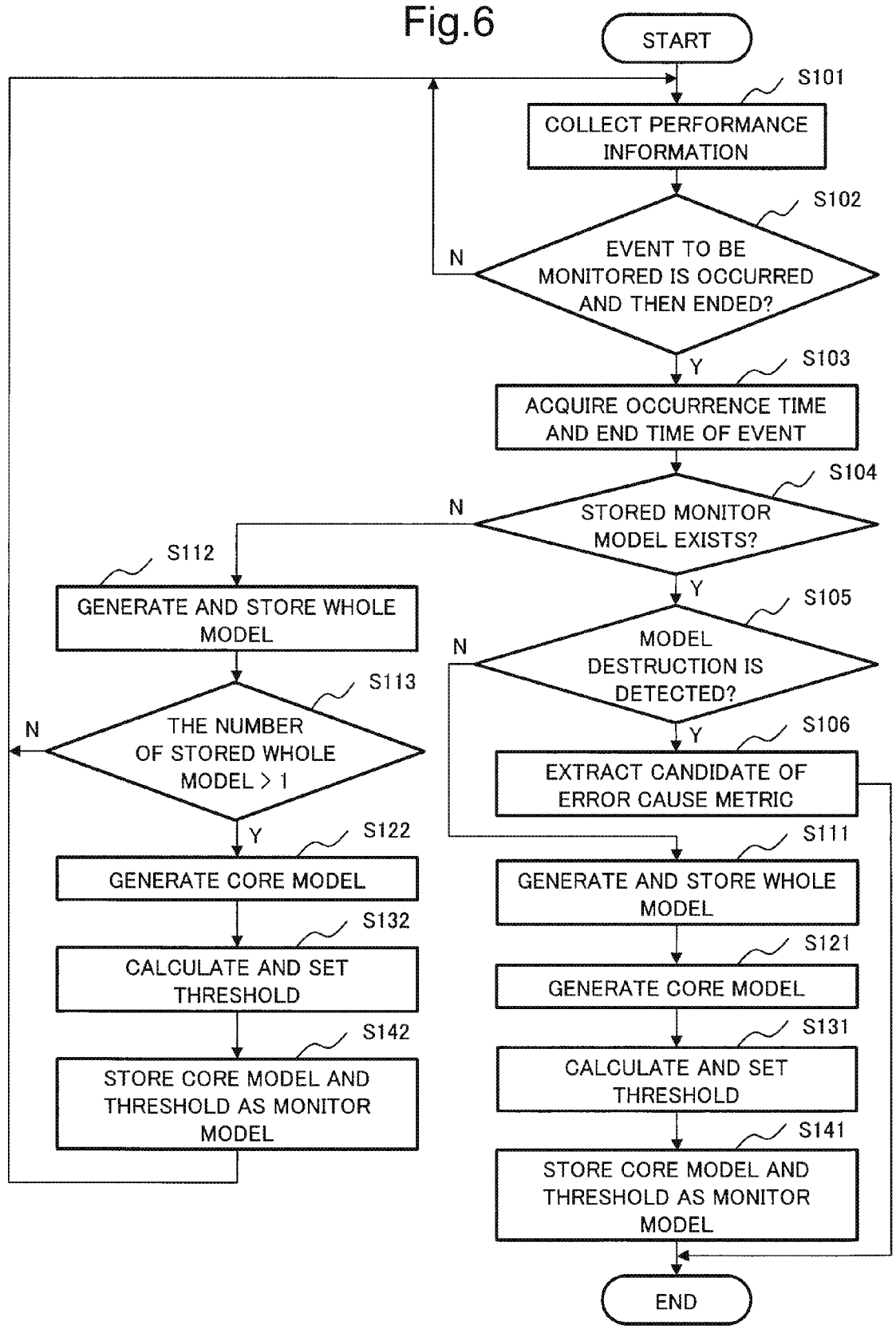
FIG. 6 is a flowchart illustrating an operation of the exemplary embodiment of the system analysis device according to the present invention.

Next, an operation of the system analysis device 100 in the first exemplary embodiment of the present invention will be described. FIG. 6 is a flowchart illustrating the operation of the system analysis device 100 of the present exemplary embodiment.

First, the performance information collection unit 101 of the system analysis device 100 collects the performance information from the monitored device 200, and stores the performance information in the performance information storage unit 111 (step S101). The performance information collection unit 101 judges an occurrence and an end of an event to be monitored (step S102), and repeats the operation of step S101 from the occurrence of the event to be monitored until the end thereof.

After the event to be monitored is occurred and ended (YES in step S102), the performance information collection unit 101 acquires occurrence time and end time of the event from the monitored device 200 (step S103).

The model generation unit 102 checks whether the monitor model is stored in the monitor model storage unit 1122 (step S104).

When the monitor model is not stored in the monitor model storage unit 1122, the model generation unit 102 generates the whole model on the basis of the occurrence time and end time of the event, and stores the whole model in the whole model storage unit 1121 (step S112).

The model generation unit 102 checks whether more than one (two or more) whole models are stored in the whole model storage unit 1121 (step S113).

When two or more whole models are not stored in the whole model storage unit 1121, it returns to step S101 without doing anything. Note that while processing of step S103 to step S142 is performed, the performance information collection unit 101 collects the performance information from the monitored device 200, and stores the performance information in the performance information storage unit 111 (step S101).

When two or more whole models are stored in the whole model storage unit 1121, the core model generation unit 1023 generates the core model (step S122). Then, the threshold setting unit 1024 calculates the threshold value 124 to be used for error determination from the whole model set (step S132). The monitor model generation unit 1022 stores the generated core model and the threshold value 124 for error determination in the monitor model storage unit 1122 as the monitor model (step S142). After that, the performance information collection unit 101 continues processing of step S101.

When the monitor model is stored in the monitor model storage unit 1122 in step S104, the model destruction detection unit 103 evaluates model destruction of the monitor model using the performance information newly collected by the performance information collection unit 101 (step S105).

When the model destruction detection unit 103 detects the destruction of the monitor model (YES in step S105), the model destruction detection unit 103 generates model destruction information. The model destruction detection unit 103 stores the model destruction information in the model destruction storage unit 113. The error cause extracting unit 104 extracts one or more candidates of an error cause metric on the basis of the model destruction information (step S106).

When the model destruction detection unit 103 does not detect the destruction of the monitor model (NO in step S105), the model generation unit 102 generates the whole model on the basis of the occurrence time and end time of the event like the procedure in S112, and stores the whole model in the whole model storage unit 1121 (step S111). The core model generation unit 1023 generates the core model (step S121). The threshold setting unit 1024 calculates the threshold value 124 for error determination from the whole model set (step S131). The monitor model generation unit 1022 stores the generated core model and the threshold value 124 for error determination in the monitor model storage unit 1122 as the monitor model (step S141). Thus, the operation of the system analysis device 100 of the present exemplary embodiment is completed.

In the present exemplary embodiment, it is assumed as the generation condition of core model that "a model whose prediction precision is equal to or greater than a predetermined threshold value in the whole model set". This can be rewritten using a concept of a distance to "a model having a numeric vector, obtained by assigning 1 to a model whose prediction precision is equal to or greater than a predetermined threshold value and assigning 0 to a model whose prediction precision is smaller than the threshold value, is all 1, and a distance obtained from the whole model set is 0". According to the condition, only models with high prediction precision are selected as elements of the core model. The generation condition of the core model of the present exemplary embodiment may be a condition selected by other method as long as the condition is selected based on criteria related to the prediction precision.

For example, it may be arranged that models with low prediction precision are included as the elements of the core model. It may be arranged also that two threshold values are provided for prediction precision to include models whose prediction precision always exceeds the two threshold values and models whose prediction precision is always smaller than the two threshold values. It may be arranged also that a ratio, by which a model satisfies the generation condition of core model, is introduced. For example, "models whose prediction precision is equal to or greater than the threshold value in 90% of the whole model set" are exemplified.

The core model generation unit 1023 may arrange, by focusing on a possible range of prediction precision, so that only models whose variation of the prediction precision fits into a predetermined range, are included in the core model. FIG. 7 is an explanatory diagram illustrating a method for extracting the core model on the basis of the threshold value related to the variation of the prediction precision. In an example illustrated in FIG. 7, the core model generation unit 1023 calculates the range of the prediction precision for each of partial models (Model 1 to Model 4 in FIG. 7). Then, the core model generation unit 1023 extracts, for example, partial models whose range of prediction precision is equal to or smaller than a predetermined value (for example, 0.1) as the core model. In the example illustrated in FIG. 7, Model 2, Model 3, and Model 4 are extracted as the core model.

In the system analysis device 100 of the present exemplary embodiment, when calculating the distance between the models, the models are represented by the numeric vector formed by 0 and 1, but the models may be represented by numeric vectors formed by real numbers. In that case, the values of prediction precision are used as elements of the numeric vectors.

The system analysis device 100 of the present exemplary embodiment may use any definition of distance for the definition of distance between the models. When the models are numeric vectors formed by 0 and 1 in calculating the distance between the models, it is preferable to use Hamming distance, edit distance, graph distance, Jacquard coefficient, dice coefficient, Simpson coefficient, or the like for the definition of the distance between the models. When the models are numeric vectors formed by real numbers, it is preferable to use Euclidean distance, standard Euclidean distance, Mahalanobis distance, Manhattan distance, Minkowski distance (a distance generalized from Manhattan distance and Euclidean distance), 1-absolute value of cosine similarity, 1-absolute value of Pearson's correlation coefficient, 1-absolute value of deviation pattern similarity, or the like, for the definition of the distance between the models. These classifications are criteria, and each one except for Hamming distance and edit distance can be used in both of the case in which the models are numeric vectors formed by 0 and 1 and the case in which the models are numeric vectors formed by real numbers.

The present exemplary embodiment uses, as the threshold value 124, "one obtained by generating a core model (whole model subset core model) excluding one whole model from the whole model set, calculating the distance between a core model and the whole model subset core model, and calculating the maximum distances for all the patterns by changing the whole model to be excluded from the whole model set" (hereinafter, referred to as the threshold value 1241). The threshold value 124 for error determination of the present exemplary embodiment may be calculated by other methods as long as the threshold value is calculated by using a fluctuation of the whole model set used when generating the core model.

For example, the threshold value 124 may be "one obtained by generating a core model (whole model subset core model) excluding one whole model from the whole model set, calculating a decrease rate of the distance between the core model and the whole model subset core model, calculating the decrease rates for all the patterns while changing the whole model to be excluded from the whole model set, and multiplying the maximum decrease rate by the size of the core model" (hereinafter, referred to as the threshold value 1242). Assuming that the number of whole models is N, the maximum decrease rate can be calculated by $\mathrm{argmax}\{(z_n-c_n)/c_n\}$, provided that the number of the models included in each whole model subset core model is $c_n$, and the number of models which are commonly included in the whole model that are not used for generating each whole model subset core model and each whole model subset core model is zn. When an occurrence of a false report is not disliked, the threshold value may be set to 0.

Figure 8:
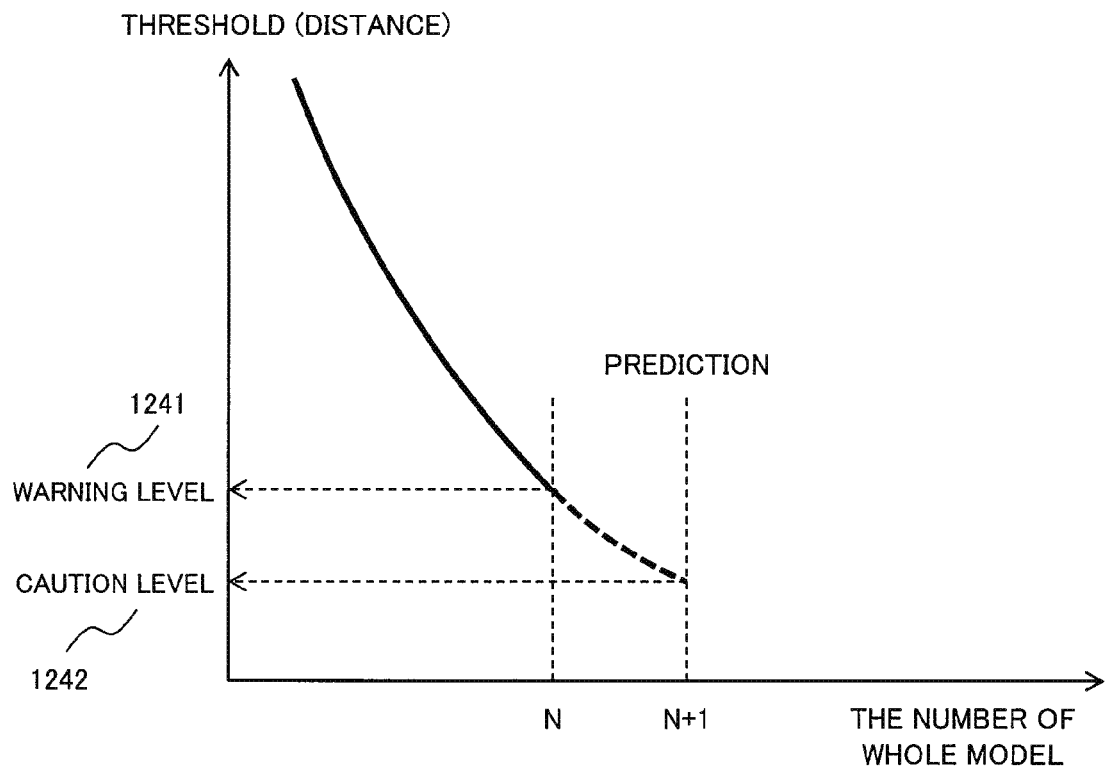
FIG. 8 is an explanatory diagram illustrating a relationship between the number of whole model and each threshold value (distance) when two threshold values are set as the threshold for error determination.

In the present exemplary embodiment, only one threshold value 124 for error determination is set, but a plurality of threshold values may be set. FIG. 8 is an explanatory diagram illustrating a relationship between the number of whole models and each threshold value (distance) when two threshold values are set as the threshold value for error determination. In this example, the higher threshold value serves as a warning level and the lower threshold value serves as a caution level. In FIG. 8, the above-mentioned threshold value 1241 is used as a threshold value for the warning level, and the threshold value 1242 is used for a threshold value for the caution level.

Figure 9:
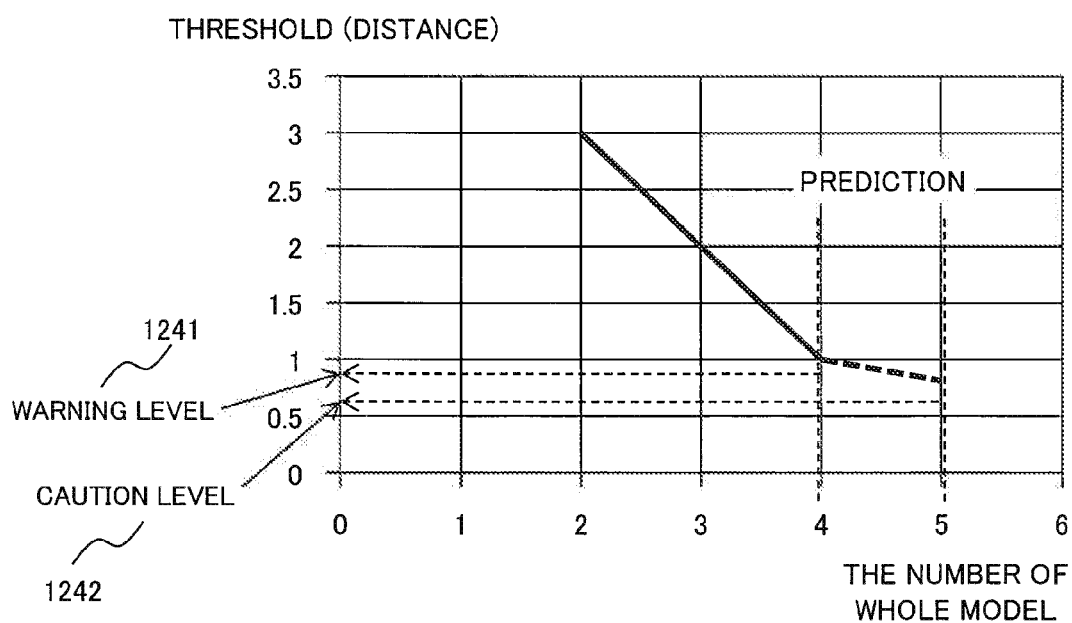
FIG. 9 is an explanatory diagram illustrating the two threshold values when calculating the threshold values illustrated in FIG. 8 using data illustrated in FIG. 2.

Note that the threshold value 124 decreases as the number of whole models used for calculation increases. This is because, as the number of the whole models included in the whole model set (size of the whole model set) increases, indefiniteness of the core model decreases, and the distance between the core model and the whole model newly added decreases. When the threshold values for error determination are set using these two definitions, a higher threshold value serves as the warning level, and a lower threshold value serves as the caution level. FIG. 9 is an explanatory diagram illustrating the two threshold values when calculating the threshold values illustrated in FIG. 8 using data illustrated in FIG. 2.

In the present exemplary embodiment, the core model is generated using the whole model set stored in the whole model storage unit 1121 to set the threshold value 124 for error determination, but a core model may be generated using only a part of whole model set as a target to set the threshold value 124 for error determination. As a method for selecting a part of the whole model set, there is a method, for example, which focuses on the time series of acquiring of the whole models, and limits the set to N pieces acquired most recently. Here, N is an integer.

In the present exemplary embodiment, the monitored system is an IT system including a server device, a network device, or the like as the monitored device 200, but the monitored system may be other systems as long as a correlation model of the monitored system can be generated and an error cause can be determined on the basis of correlation destruction. For example, the monitored system may be a plant system, a structure, a transport machine, or the like. In this case, the system analysis device 100, for example, generates a monitor model by using values of various sensors as the metrics, and performs a detection of model destruction and an extraction of one or more candidates of an error cause.

According to the system analysis device 100 of the present exemplary embodiment, the system analysis device, the system analysis method, and the system analysis program which can be applied to monitor an event having low occurrence frequency can be provided. This is because the core model generation unit 1023 extracts characteristic behavior for an event as a core model, and the threshold setting unit 1024 sets a threshold value in consideration of indefiniteness resulting from the low occurrence frequency of the event, which allows an acquisition of highly accurate information from a monitor model even in the low occurrence frequency. In addition, the calculated threshold value corresponds to the indefiniteness due to the insufficiency of the number of the collected events, and the change exceeding the threshold value can be said to be an obvious error. Therefore, according to the system analysis device 100 of the present exemplary embodiment, the clear criteria for error determination are provided for an event having low occurrence frequency. Furthermore, according to the system analysis device 100 of the present exemplary embodiment, it is possible to reduce a workload for monitoring since characteristic behavior for an event can be automatically extracted.

Figure 10:
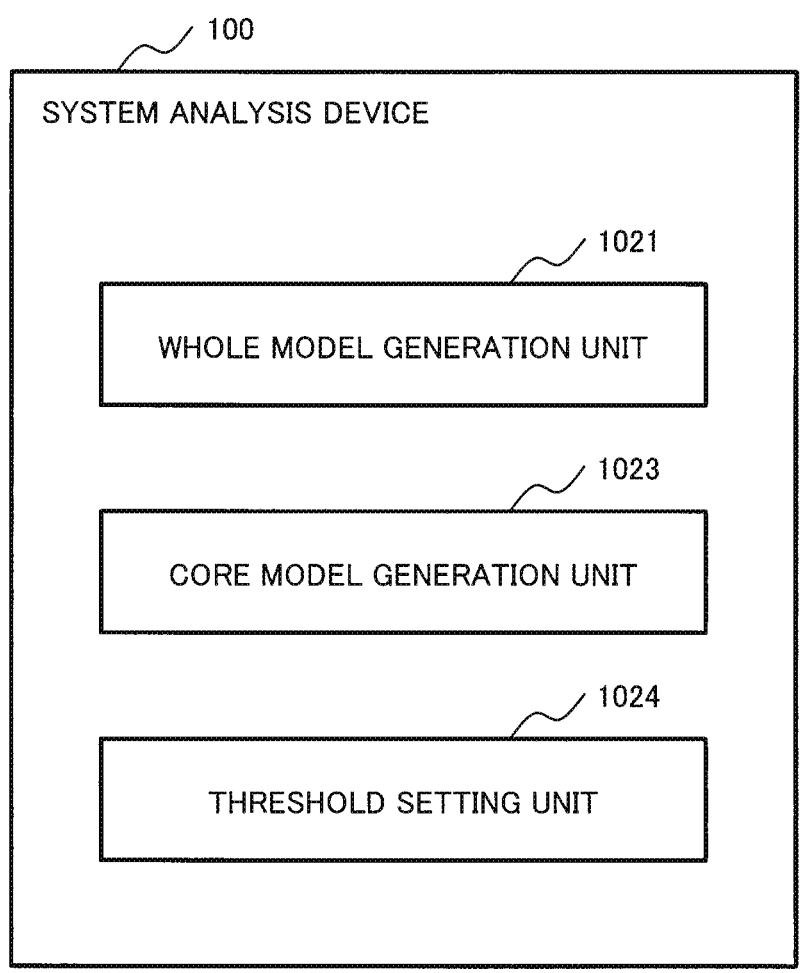
FIG. 10 is a block diagram illustrating a main part of the system analysis device according to the present invention.

FIG. 10 is a block diagram illustrating a main part of the system analysis device according to the present invention. As illustrated in FIG. 10, the system analysis device according to the present invention includes, as main components, a whole model generation unit 1021 which generates a whole model which is obtained by modeling one or more elements or whole of a system and which includes a plurality of partial models, a core model generation unit 1023 which extracts, from a plurality of whole models generated on the basis of the same event, the partial models whose prediction precision satisfies a predetermined criteria, and generates a core model by integrating the extracted partial models, and a threshold setting unit 1024 which calculates a distance between the core model and the plurality of whole models using a predetermined definition, and outputs the distance as a threshold value for error determination using the core model.

(1) The system analysis device including a model destruction detection unit which calculates, when an event to be monitored occurs in a system, a distance between the core model (for example, core model 123*a*) and a new whole model generated on the basis of the event using the predetermined definition, and detects model destruction by comparing the distance with the threshold value.

(2) The system analysis device may be configured so that the core model generation unit (for example, core model generation unit 1023) generates the core model by integrating partial models (for example, Model 2, Model 4, Model 5, Model 8 in FIG. 2) that are commonly included in a plurality of whole models (for example, the whole model 122*a* to the whole model 122*d*) generated on the basis of the same event, and whose prediction precision is equal to or greater than a predetermined value for all the whole models.

(3) The system analysis device may be configured so that the core model generation unit generates the core model by integrating partial models that are commonly included in a plurality of whole models generated on the basis of the same event, and whose variance of prediction precision is equal to or smaller than a predetermined value for all the whole models.

(4) The system analysis device may be configured so that the core model generation unit generates the core model by integrating partial models that are commonly included in a plurality of whole models generated on the basis of the same event, and whose prediction precision is equal to or greater than a predetermined value and whose variance of prediction precision is equal to or smaller than a predetermined value for all the whole models.

(5) The system analysis device may be configured so that the core model generation unit generates the core model by integrating partial models that are commonly included in a plurality of whole models generated on the basis of the same event, and whose prediction precision is equal to or greater than a predetermined value or whose variance of prediction precision is equal to or smaller than a predetermined value for all the whole models.

(6) The system analysis device may be configured so that the threshold setting unit (for example, the threshold setting unit 1024) generates a whole model subset obtained by excluding one whole model from a plurality of whole models, generates a core model of the whole model subset (for example, the whole model subset core model) as a partial core model for each excluded whole model (for example, w/o 2000/12/24 to w/o 2003/12/24 in FIG. 3), calculates a distance between all partial core models and the core model generated by the core model generation unit using a predetermined definition, and set the maximum distance as the threshold value.

(7) The system analysis device may be configured so that the threshold setting unit uses Hamming distance of the prediction precision of the partial model as the distance between the core model and the whole model.

(Supplementary Note) The system analysis device may be configured so that the threshold setting unit uses 1-cosine similarity of the prediction precision of the partial model as the distance between the core model and the whole model.

This application is based upon and claims the benefit of priority from Japanese Patent Applications No. 2013-132226 filed on Jun. 25, 2013 and No. 2013-175176 filed on Aug. 27, 2013, the disclosures of which are incorporated herein in their entirety by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention is applicable to detection of an error or a failure of a system, and a cause determination, on the basis of model destruction detected on the monitor model.

REFERENCE SIGNS LIST

100 System analysis device
101 Performance information collection unit
102 Model generation unit
1021 Whole model generation unit
1022 Monitor model generation unit
1023 Core model generation unit
1024 Threshold setting unit
103 Model destruction detection unit
104 Error cause extracting unit
111 Performance information storage unit
112 Model storage unit
1121 Whole model storage unit
1122 Monitor model storage unit
113 Model destruction storage unit
200 Monitored device

What is claimed is:

1. A system analysis device comprising:
a whole model generation unit which generates a whole model which is obtained by modeling one or more elements or whole of a system and which includes a plurality of partial models;
a core model generation unit which extracts, from a plurality of whole models generated on the basis of the same event, the partial models whose prediction precision satisfies a predetermined criteria, and generates a core model by integrating the extracted partial models; and
a threshold setting unit which calculates a distance between the core model and the plurality of whole models using a predetermined definition, and outputs the distance as a threshold value for error determination using the core model.

2. The system analysis device according to claim 1 further comprising a model destruction detection unit which calculates, when an event to be monitored occurs in a system, a distance between the core model and a new whole model generated on the basis of the event using the predetermined definition, and detects model destruction by comparing the distance with the threshold value.

3. The system analysis device according to claim 1 wherein
the core model generation unit generates the core model by integrating partial models which are commonly included in the plurality of whole models generated on the basis of the same event, and whose prediction precision is equal to or greater than a predetermined value for all the whole models.

4. The system analysis device according to claim 1 wherein
the core model generation unit generates the core model by integrating partial models which are commonly included in the plurality of whole models generated on the basis of the same event, and whose variance of prediction precision is equal to or smaller than a predetermined value for all the whole models.

5. The system analysis device according to claim 1 wherein
the core model generation unit generates a core model by integrating partial models which are commonly included in the plurality of whole models generated on the basis of the same event, and whose prediction precision is equal to or greater than a predetermined value and whose variance of prediction precision is equal to or smaller than a predetermined value for all the whole models.

6. The system analysis device according to claim 1 wherein
the core model generation unit generates a core model by integrating partial models which are commonly included in the plurality of whole models generated on the basis of the same event, and whose prediction precision is equal to or greater than a predetermined value or whose variance of prediction precision is equal to or smaller than a predetermined value for all the whole models.

7. The system analysis device according to claim 1 wherein
the threshold setting unit generates a whole model subset obtained by excluding one whole model from a plurality of whole models, generates a core model of the whole model subset as a partial core model for each excluded whole model, calculates a distance between all partial core models and the core model generated by the core model generation unit using a predetermined definition, and set the maximum distance as the threshold value.

8. The system analysis device according to claim 1 wherein
the threshold setting unit uses Hamming distance of the prediction precision of the partial model as the distance between the core model and the whole model.

9. A system analysis method comprising:
generating a whole model which is obtained by modeling one or more elements or whole of a system and which includes a plurality of partial models;

extracting, from a plurality of whole models generated on the basis of the same event, the partial models whose prediction precision satisfies a predetermined criteria, and generating a core model by integrating the extracted partial models; and calculating a distance between the core model and the plurality of whole models using a predetermined definition, and outputting the distance as a threshold value for error determination using the core model.

10. A non-transitory computer readable storage medium recording thereon a system analysis program causing a computer to execute processes comprising:

a whole model generation process which generates a whole model which is obtained by modeling one or more elements or whole of a system and which includes a plurality of partial models;

a core model generation process which extracts, from a plurality of whole models generated on the basis of the same event, the partial models whose prediction precision satisfies a predetermined criteria, and generates a core model by integrating the extracted partial models; and a threshold setting process which calculates a distance between the core model and the plurality of whole models using a predetermined definition, and outputs the distance as a threshold value for error determination using the core model.

11. A system analysis device comprising:

a whole model generation means for generating a whole model which is obtained by modeling one or more elements or whole of a system and which includes a plurality of partial models;

a core model generation means for extracting, from a plurality of whole models generated on the basis of the same event, the partial models whose prediction precision satisfies a predetermined criteria, and generating a core model by integrating the extracted partial models; and a threshold setting means for calculating a distance between the core model and the plurality of whole models using a predetermined definition, and outputting the distance as a threshold value for error determination using the core model.

* * * * *